United States Patent
Finkelstein et al.

(10) Patent No.: US 10,650,547 B2
(45) Date of Patent: May 12, 2020

(54) BLOB DETECTION USING FEATURE MATCH SCORES

(71) Applicant: Microsoft Technology Licensing, LLC, Redmond, WA (US)

(72) Inventors: Nir Finkelstein, Redmond, WA (US); John Benjamin Hesketh, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 110 days.

(21) Appl. No.: 16/046,794

(22) Filed: Jul. 26, 2018

(65) Prior Publication Data

US 2020/0034983 A1    Jan. 30, 2020

(51) Int. Cl.
| | |
|---|---|
| *G06K 9/62* | (2006.01) |
| *G06T 7/73* | (2017.01) |
| *G06T 7/13* | (2017.01) |
| *G06T 7/90* | (2017.01) |
| *G06T 7/60* | (2017.01) |

(52) U.S. Cl.
CPC ............... *G06T 7/73* (2017.01); *G06T 7/13* (2017.01); *G06T 7/60* (2013.01); *G06T 7/90* (2017.01); *G06T 2207/10016* (2013.01); *G06T 2207/10024* (2013.01)

(58) Field of Classification Search
CPC .. G06T 2207/10032; G06T 7/11; G06T 7/143; G06T 7/174; G06T 7/194; G06T 2207/0016; G06K 9/6218; G06K 9/0063; G06K 9/00785; G06K 9/6202; G08G 1/04

USPC ............ 382/103, 155, 171; 348/169; 725/12
See application file for complete search history.

(56) References Cited

U.S. PATENT DOCUMENTS

| | | | |
|---|---|---|---|
| 8,111,873 | B2 | 2/2012 | Berthilsson et al. |
| 9,465,997 | B2 | 10/2016 | Tu et al. |
| 2008/0166015 | A1 | 7/2008 | Haering et al. |
| 2009/0245573 | A1* | 10/2009 | Saptharishi ............. G06T 7/246 |
| | | | 382/103 |

(Continued)

FOREIGN PATENT DOCUMENTS

WO    2012005387 A1    1/2012

OTHER PUBLICATIONS

"Blob Detection", Retrieved from: https://web.archive.org/web/20110401074207/http:/www.cs.umd.edu/~djacobs/CMSC426/Blob.pdf, Apr. 1, 2011, pp. 1-11.

(Continued)

*Primary Examiner* — Phuoc H Doan
(74) *Attorney, Agent, or Firm* — Alleman Hall Creasman & Tuttle LLP

(57) ABSTRACT

A computer system is provided that includes a camera device configured to capture images of a physical scene and a processor configured to store a list of identified blobs. Each identified blob includes a determined blob feature and a path of tracked positions for that identified blob. The processor is configured to receive a series of images of the physical scene from the camera device, detect a candidate blob in a candidate image of the series of images, determine a blob feature of the candidate blob and a position of the candidate blob in the candidate image captured by the camera device. For each identified blob in the list, the processor is configured to compute a match score between the candidate blob and that identified blob.

20 Claims, 10 Drawing Sheets

(56) References Cited

U.S. PATENT DOCUMENTS

2009/0304229 A1* 12/2009 Hampapur ......... G06K 9/00771
   382/103
2015/0310628 A1  10/2015 Burry
2017/0278266 A1   9/2017 Hassan et al.
2018/0197294 A1   7/2018 Pan et al.

OTHER PUBLICATIONS

Patro, Badri Narayana, "Design and implementation of novel image segmentation and BLOB detection algorith for real-time video surveillance using DaVinci processor", In Proceedings of International Conference on Advances in Computing, Communications and Informatics, Sep. 24, 2014, pp. 1909-1915.

Javed, et al., "Modeling Inter-camera Space-time and Appearance Relationships for Tracking Across Non-Overlapping Views", In Journal of Computer Vision and Image Understanding, vol. 109, Issue 2, Feb. 1, 2008, pp. 146-162.

Khan, et al., "Consistent Labeling of Tracked Objects in Multiple Cameras with Overlapping Fields of View", In Proceedings of the IEEE Transactions on Pattern Analysis and Machine Intelligence, vol. 25, Issue 10, Oct. 2003, pp. 1355-1360.

Mohedano, Raul, "Bayesian Scene Analysis for Multi-Camera 3D Tracking and Camera Positioning", Retrieved from: http://oa.upm.es/36420/1/RAUL_MOHEDANO_DEL_POZ0_2_pdf, Jun. 26, 2014, 88 Pages.

"International Search Report and Written Opinion Issued in PCT Application No. PCT/US19/038089", dated Sep. 5, 2019, 14 Pages.

* cited by examiner

US 10,650,547 B2

BLOB DETECTION USING FEATURE MATCH SCORES

BACKGROUND

Current blob detection techniques are able to track objects while they move within the frame of view of the camera. However, typical blob detection techniques can be inaccurate when reidentifying and tracking objects that have moved out of the frame of view of the camera for a period of time.

SUMMARY

A computer system is provided that may include a camera device configured to capture images of a physical scene and a processor configured to store a list of identified blobs. Each identified blob may include a determined blob feature and a path of tracked positions for that identified blob. The processor may be further configured to receive a series of images of the physical scene from the camera device, detect a candidate blob in a candidate image of the series of images, determine a blob feature of the candidate blob and a position of the candidate blob in the candidate image captured by the camera device. For each identified blob in the list, the processor may be configured to compute a match score between the candidate blob and that identified blob based on a feature match between the determined blob features of the candidate blob and that identified blob and a proximity between the position of the candidate blob and the path of tracked positions for that identified blob. The processor may be further configured to identify the candidate blob as being a new blob or one of the identified blobs in the list based on the match score. If the candidate blob is identified as being a new blob, the processor may be configured to update the list of identified blobs with the candidate blob. If the candidate blob is identified as one of the identified blobs in the list, the processor may be configured to update the path of tracked positions for the one of the identified blobs with the determined position of the candidate blob.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
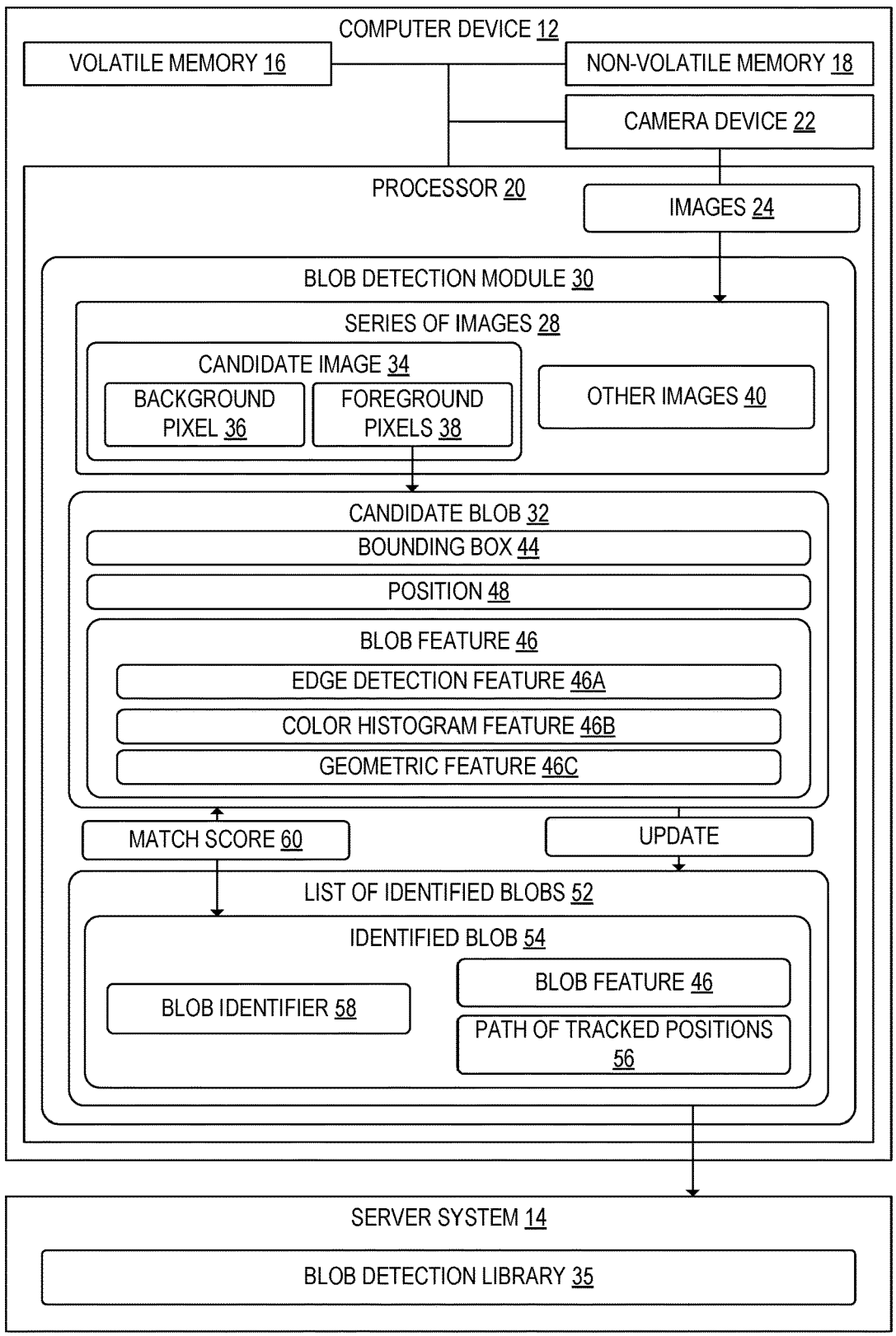
FIG. 1 shows a schematic representation of an example computer system, according to one embodiment of the present disclosure.

In order to address the challenges discussed above, a computer system 10 is provided, as shown in the example embodiment of FIG. 1. The computer system 10 may include one or more computer devices 12 and a server system 14. The one or more computer devices 12 may include volatile memory 16, non-volatile memory 18, a processor 20, a camera device 22, and other suitable computer components. In one example, the computer device 12 may take the form of a desktop computer device or mobile computer device configured to communicate with one or more camera devices 22 separate from the computer device 12. In another example, the computer device 12 takes the form of a camera device 22 that includes the processor 20 integrated with the camera device 22 in a single housing. In this example, the computer system 10 may include a plurality of processor integrated camera devices each configured to perform the processes and methods described herein, and communicate with each other over a network, such as, for example, a wireless network.

Each camera device 22 is configured to capture images 24 of a physical scene 26 in the frame of view of that camera device 22. The processor 20 is configured to receive a series of images 28 of the physical scene 26 from the camera device. For example, the camera device 22 may be configured to capture a video of the physical scene 26, and the series of images 28 may include each frame of the captured video. As another example, the camera device 22 may be configured to capture sequential images at periodic intervals, such as, for example, every second, every five seconds, etc.

Figure 2:
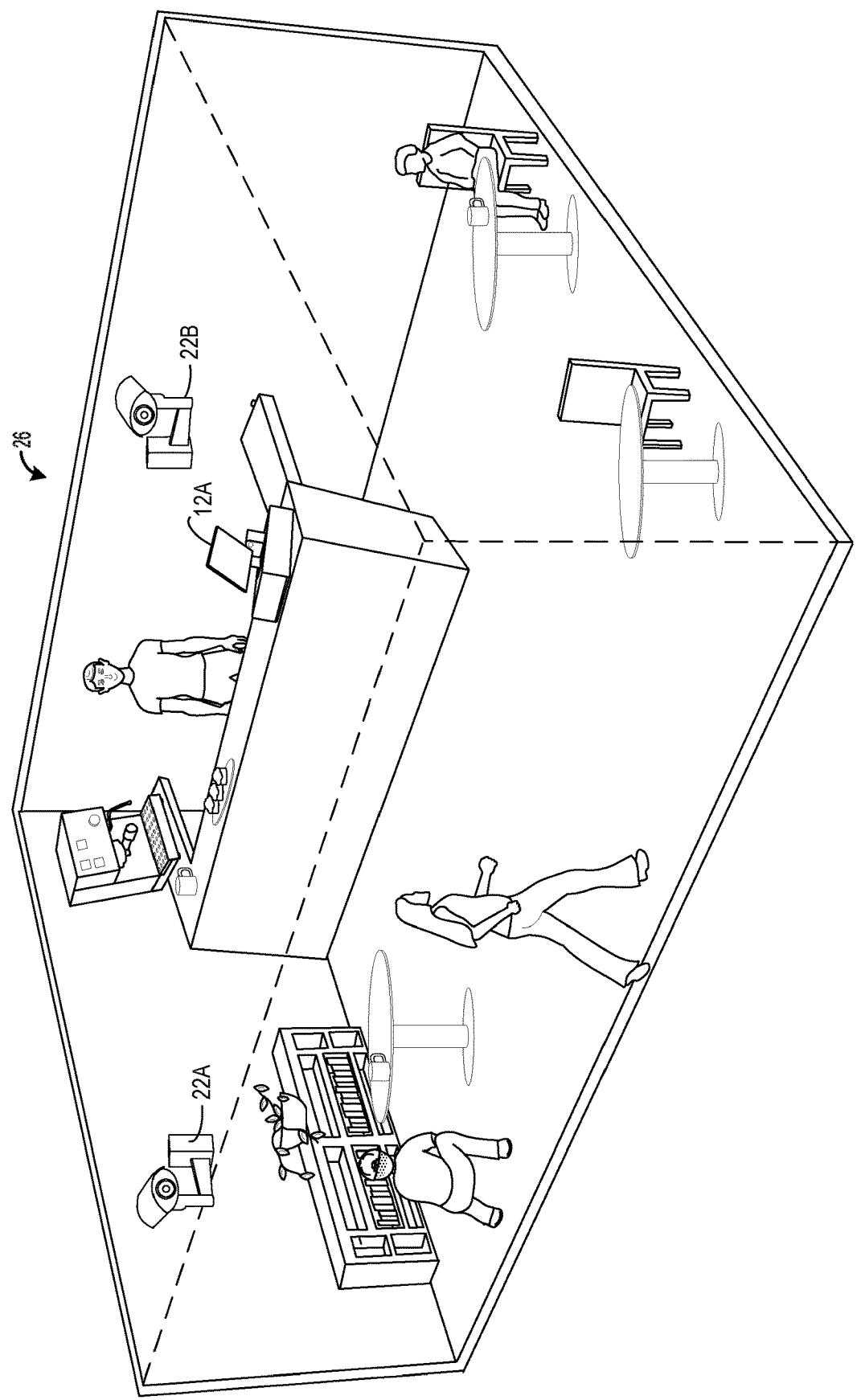
FIG. 2 shows an example physical scene being imaged by camera devices of the computer system of FIG. 1.

FIG. 2 illustrates an example physical scene 26 of a coffee shop. Images of the physical scene 26 are captured by one or more camera devices, such as, for example, a first camera device 22A and a second camera device 22B, which are viewing the physical scene 26 from different positions and orientations. The first camera device 22A and the second camera device 22B may capture a sequential series of images of the physical scene 26, and send the series of images 28 to the processor 20 of the computer device 12. In one example, a processor 20 is integrated into both the first camera device 22A and the second camera device 22B in the form of processor integrated camera devices. In this example, the first camera device 22A may be configured to communicate with the second camera device 22B over a network, such as a wireless network. In another example, the first camera device 22A and the second camera device 22B may be configured to send the series of images 28 to a processor 20 included in the example computer device 12A that is housed separately from the camera devices.

Turning back to FIG. 1, a blob detection module 30 executed by the processor 20, which may be integrated with each camera device 22 or housed in a separate computer device, is configured to processes the series of images 28 to detect a candidate blob 32 in a candidate image 34 of the series of images 28. The blob detection module 30 may be installed on the computer device 12 from a blob detection library 35 stored on the server system 14. In one example, each processor integrated camera device of the computer system 10 may be configured to install and update the blob detection module 30 from the server 14. In this manner, each processor integrated camera device of the computer system 10 may be configured to communicate with each other over a network, and detect, identify, and store data for candidate blobs 32 according to the same rules and methods as defined by the blob detection library 35 from the server system 14.

In one example blob detection technique, the blob detection module 30 may be configured to, for each pixel in the candidate image 34 of the series of images 28, identify whether that pixel is a background 36 or a foreground pixel 38 based on a history of that pixel over the series of images 28. The background of the physical scene 26 may include walls, floors, tables, and other objects that typically do not frequently move over time or have a relatively static position over the series of images 28. The blob detection module 30 may be configured to detect the pixel color values for each pixel position in the other images 40 captured by a camera device 22 over a period of time and may determine a baseline pixel color value for each pixel position in the series of images 28. After establishing a baseline pixel color value for each pixel position, the blob detection module 30 may compare a pixel color value of each pixel in the candidate image 32 to the corresponding baseline pixel color value for that pixel position in the frame of the images captured by that camera device 22 to determine a color difference. Pixels of the candidate image 32 having a color difference below a threshold value may be tagged as a background pixel 36, and pixels of the candidate image 32 having a color difference above the threshold value may be tagged as a foreground pixel 38. After identifying the background pixels 36 and the foreground pixels 38, the blob detection module 30 may be configured to detect the candidate blob 32 based on identifying a contiguous group of foreground pixels 38 in the candidate image 34.

Figure 3A:
FIG. 3A shows an example candidate image of a series of images captured by the camera devices of the computer system of FIG. 1.

FIG. 3A shows an example candidate image 34 captured by the first camera device 22A illustrated in FIG. 2. The processor 20 may be configured to identify each pixel in the example candidate image 34 as being a background pixel 36 or a foreground pixel 38. As described above, the processor 20 may determine a baseline value for each pixel based on an example other image 40 illustrated in FIG. 3B, as well as other images in the series of images 28. For example, the processor 20 may compare the pixel P1 in the example candidate image 34 to the pixel P2 in the example other image 40 that has the same pixel position in the image frame captured by the first camera device 22A. In the illustrated example, both pixels P1 and P2 lie on a wall of the coffee shop, and thus have the same or substantially similar color values. As the color difference between the pixels P1 and P2 is less than a threshold value, the pixel P1 of the example candidate image 34 may be identified as a background pixel 36. It should be appreciated that while FIGS. 3A and 3B only illustrate two images, that the processor 20 may be configured to compare pixels of the candidate image 34 to a plurality of other images 40 used to determine a baseline value for each pixel position in the image frame of the first camera device 22A.

Figure 3B:
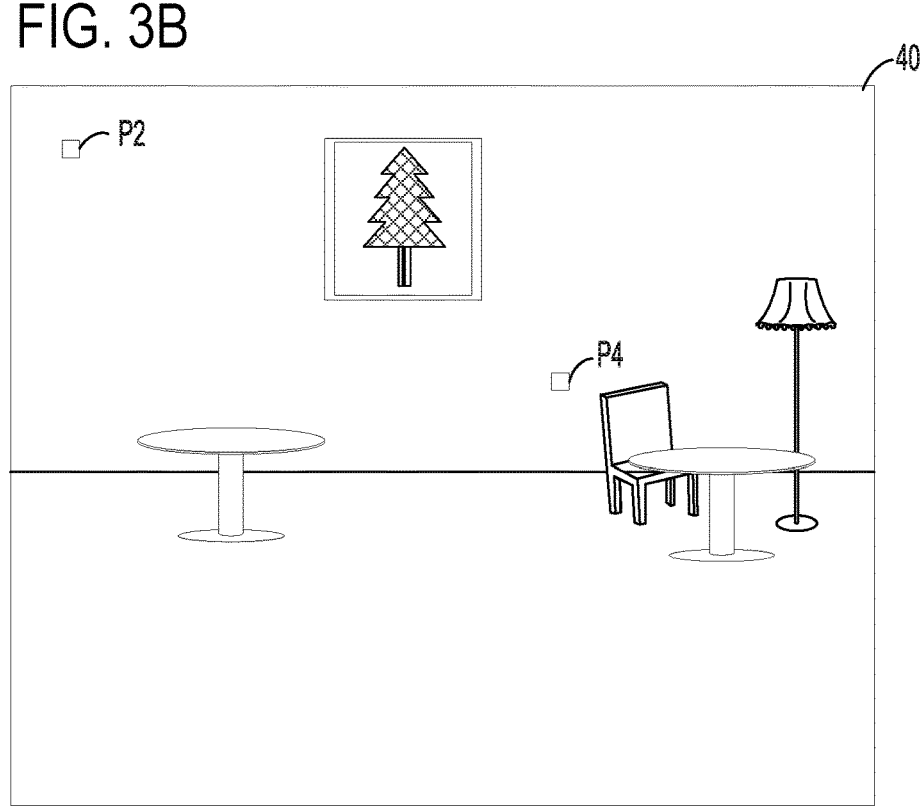
FIG. 3B shows another example image of the series of images captured by the camera device of the computer system of FIG. 1.

Continuing the example illustrated in FIGS. 3A and 3B, the processor 20 may compare the pixel P3 in the example candidate image 34 to the pixel P4 in the example other image 40 of the series of images 28. As shown, the pixel P3 in the example candidate image 34 lies on a moving object, which, in the illustrated example, is a walking person. As the object is moving, the pixels in the other images 40 of the series of images 28 at the same pixel position are likely to be different. In particular, the pixels in the other images 40 at the same pixel position will have the color value of the background, which, in the illustrated example is a wall of the coffee shop. As the color difference between the pixels P3 and P4 is greater than the threshold value, the pixel P3 of the example candidate image 34 may be identified as a foreground pixel 38.

Figure 4A:
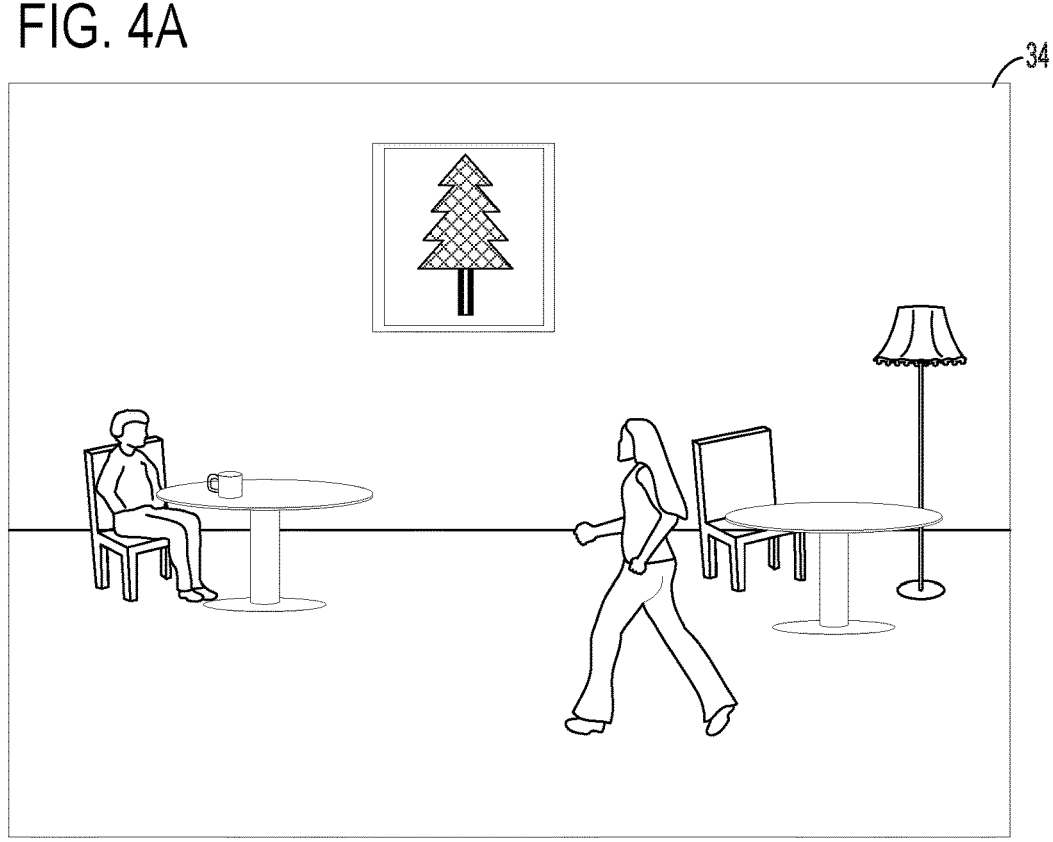
FIG. 4A shows an example candidate image of a series of images captured by the camera devices of the computer system of FIG. 1.

Turning to FIG. 4A, after the processor 20 has identified each pixel in the example candidate image 34 as being a background pixel 36 or a foreground pixel 38, the processor 20 may detect candidate blobs 32 based on identifying contiguous groups of foreground pixels 38. In the example illustrated in FIG. 4B, the processor 20 detects three contiguous groups of foreground pixels 38, which include a first contiguous group of foreground pixels 42A, a second group of contiguous foreground pixels 42B, and a third group of contiguous foreground pixels 42C. In one example, contiguous groups of foreground pixels below a threshold size are not detected as candidate blobs 32. The threshold size may be set to achieve a desired blob detection sensitivity. In the example illustrated in FIG. 4B, the threshold size may be set to detect blobs that are the size of a person. Thus, the processor 20 may be configured to determine that the first contiguous group of foreground pixels 42A and the third group of contiguous foreground pixels 42C are larger than the threshold size, and are detected as candidate blobs 32. On the other hand, the second contiguous group of foreground pixels 42B is smaller than the threshold size, and may be ruled out from being detected as a candidate blob 32.

Figure 4B:
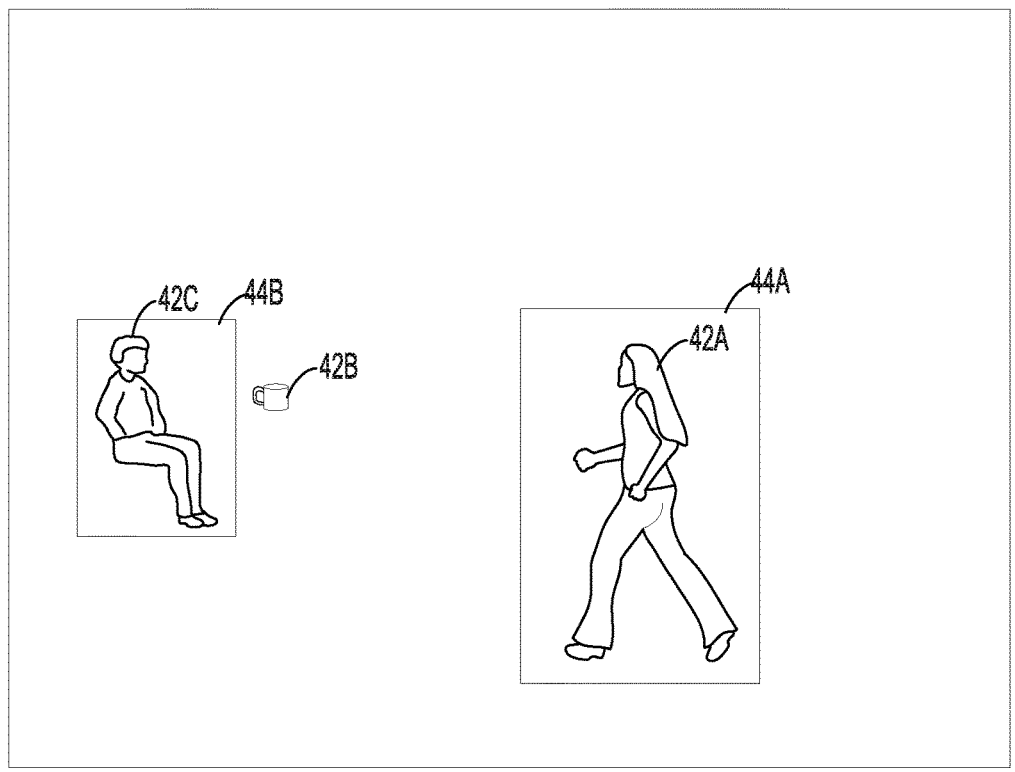
FIG. 4B shows an example candidate blob in the candidate image captured by the camera devices of the computer system of FIG. 1.

Due to lighting, noise filtering, and other sources of visual processing artifacts, some pixels within a contiguous group of foreground pixels may potentially be misidentified as background pixels 36 in the candidate image 34. For example, a person's shirt may have a similar color as a wall of the physical space 26, and thus pixels lying on the person's shirt may potentially be misidentified as being background pixels lying on the wall of the physical space 26. To address this issue, in one example, the processor 20 may be configured to determine a bounding box 44 for the candidate blob 32. FIG. 4B illustrates a first bounding box 44A that encompasses the first contiguous group of foreground pixels 42A, and a second bounding box 44B that encompasses the third contiguous group of foreground pixels 42C. Thus, if the first contiguous group of foreground pixels 42A become separated because the person's shirt is misidentified as being background pixels, the remaining foreground pixels that still lie within the first bounding box 44A may nonetheless be associated as the same contiguous group of pixels. It should be appreciated that while the example bounding boxes 44 are illustrated as rectangles, the bounding boxes 44 may take other suitable geometric forms, such as, for example, circles, ellipses, etc.

Turning back to FIG. 1, after identifying a candidate blob 32 in the candidate image 34, the blob detecting module 30 executed by the processor 20 is further configured to determine one or more blob features 46 of the candidate blob 32 based on the characteristics of the contiguous group of foreground pixels 38. In one example, the one or more blob features 46 may include an edge detection feature 46A, a color histogram feature 46B, and a geometric feature 46C, and other suitable blob features. For example, the blob detection module 30 may be configured to detect one or more edges of the contiguous of foreground pixels in the candidate blob 32 and distances between those edges for the edge detection feature 46A. As another example, the blob detection module 30 may be configured to extract a color histogram for the contiguous group of foreground pixels. The color histogram may include data indicating a distribution of colors for the candidate blob 32, an entropy value for the colors of the candidate blob 32, etc. As another example, the blob detectable module 30 may be configured to determine one or more geometric features of the candidate blob 32, such as, for example, a blob area, a size of the boundary box 40, a blob shape, a blob height and width, geometric moments of the blob, etc. It should be appreciated that the blob features 46 described above are merely exemplary, and that the blob detection module 30 may be configured to detect and extract other types of blob features 46 for the candidate blob 32.

The blob detection module 30 executed by the processor 20 is further configured to determine a position 48 of the candidate blob 32 in the candidate image 34 captured by the camera device 22. In one example, the position 48 of the candidate blob 32 may be determined relative to the image frame of the camera device 22 that captured the candidate image 34. That is, the position 48 of the candidate blob 32 may be determined based on the pixel positions of the pixels in the candidate blob 32, such as, for example, pixel coordinate X and Y in the candidate image 32. If the camera device 22 moves, then the position 48 may correspondingly offset.

In another example, the blob detection module 30 may be configured to detect one or more background features 50 of the background pixels 36. In the example illustrated in FIG. 5, the blob detection module 30 may detect the picture of a tree handing on the wall of the physical space 26 as a first background feature 50A of the background pixels 36. As another example, a table object in the physical space 26 may be detected as a second background feature 50B. As yet another example, the corner where the wall meets the floor of the physical space 26 may be detected as a third background feature 50C. However, it should be appreciated that the illustrated background features 50A-50C are merely exemplary, and that any other machine identifiable background features may also be detected by the blob detection module 30.

In this example, the blob detection module 30 may be configured to determine the position 48 of the candidate blob 32 relative to the one or more detected background features 50. For example, the blob detection module 30 may be configured to measure a distance, such as a pixel distance or physical distance, between the candidate blob 32 and one or more of the detected background features 50 in the candidate image 34. The measured distances may be stored with the candidate blob 32 as the position 48 data. If the computer system 10 includes a plurality of camera devices 22, the one or more detected background features 50 may be used to determine the candidate blob 32's position relative to each of the plurality of camera devices 22 that also have a view of the one or more detected background features 50.

As illustrated in FIG. 1, the blob detection module 30 may be configured to identify the candidate blob 32 by comparing the determined blob features 46 and position 48 of the candidate blob 32 to a stored list of identified blobs 52. Each identified blob 54 may include a determined blob feature 46, a path of tracked positions 56 for that identified blob 54, and a blob identifier 58 that is unique to that identified blob 54 in the list. The blob features 46 of the identified blobs 54 may have been determined in the same manner as for the candidate blob 32. The path of tracked positions 56 for the identified blob 54 may be a vector or a linked-path of detected positions 48 that were detected over time, such as, for example, during the period of time that the series of images 28 were sequentially captured. That is, the path of tracked positions 56 indicates how the candidate blob 54 has moved relative to the camera devices 22 over time, including a last detected position. The position 48 of the candidate blob 32 may be computed at a center, centroid, etc., of the candidate blob 32 or the bounding box 44 for the candidate blob 32.

The list of identified blobs 52 may have been compiled and stored by the computer device 12 that detected the candidate blob 32. In another example, one or more of the identified blobs in the list 52 may have been detected by other computer devices 12 of the computer system 10. For example, computer system 10 may include a plurality of computer devices 12 taking the form of a plurality of processor integrated camera devices that are each configured to perform the processes and techniques described herein. Each of the plurality of processor integrated camera devices may be further configured to maintain and update a stored list of identified blobs, and share the updated list of identified blobs with other processor integrated camera devices. In this manner, the candidate blob 32 may be identified as an identified blob 54 that was initially identified by a different processor integrated camera device. In another example, a master list of identified blobs may be stored on the server system 14, and synced with a local list of identified blobs stored on each computer device 12, such as, for example, each of a plurality of processor integrated camera devices configured to communicate with the server system 14 over a network.

As illustrated in FIG. 1, the blob detection module 30 executed by the processor 20 may be configured to compare the candidate blob 32 to the list of identified blobs 52 to determine whether there is a match between the candidate blob 32 and one of the identified blobs 52. In one example, for each identified blob 54 in the list 52, the blob detection module 30 may compute a match score 60 between the candidate blob 32 and that identified blob 54. To compute the match score 60, the blob detection module 30 may run several tests, and sum a score value for those tests. The candidate blob 32 may be identified as the identified blob 54 with the highest match score 60 above a threshold value. If the match score 60 for each identified blob 54 in the list 52 is below the threshold value, then the candidate blob 32 may be identified as a new blob.

The match score 60 may be computed based on a feature match between the determined blob features 46 of the candidate blob 32 and the identified blob 54 being compared. The blob detection module 30 may utilize any suitable feature matching algorithm to compute the feature match between the candidate blob 32 and the identified blob 54. For example, a score for the feature match may be computed using an Orientated FAST and Rotate BRIEF (ORB) algorithm. The score for the feature match may be computed to be proportional to a number of feature matches found between the candidate blob 32 and the identified blob 54 using the feature matching algorithm. As another non-limiting example, the blob detection module 30 may use a neural network to generate a thumbprint of the determined blob features 46 for the candidate blob 32 and the identified blob 54, and compute a score for the feature match based on comparing the generated thumbprints. As yet another non-limiting example, the blob detection module 30 may use a scale-invariant feature transform (SIFT) algorithm to generate a feature description of the candidate blob 32 and the identified blob 54 that may be used to compute the feature score. It should be appreciated that the feature matching techniques described above are merely exemplary, and that other suitable algorithms may be utilized by the blob detection module 30 to compute a feature match score between the candidate blob 32 and the identified blob 54 being compared.

The match score 60 may be further computed based on a proximity between the position 48 of the candidate blob 32 and the path of tracked positions 56 for that identified blob 54. For example, the blob detection module 30 may be configured to calculate a distance, such as a pixel distance or physical distance, between the position 48 of the candidate blob 32 and a last known position of the path of tracked positions 56 for the identified blob 54 being compared. A smaller distance may be given a higher proximity score than a larger distance. That is, the closer in proximity the candidate blob 32 is to the last known position of the identified blob 54 being compared, the higher the proximity score given to that identified blob 54.

In another example, the proximity score may be further calculated based on an overlap between the bounding box 44 of the candidate blob 32 and the path of tracked positions 56 for the identified blob 54. That is, the bounding box 44 for the candidate blob 32 may be compared to the existing path of tracked positions 56 for each identified blob 54 in the list 52, and the blob detection module 30 may be configured to calculate a proximity score based on a ratio of overlapping area of the bounding box 44 with the path of tracked position 56 for that identified blob 54. In one example, larger ratios of overlap between the bounding box 44 of the candidate blob 32 and the path of tracked positions 56 for that identified blob 54 are given higher match scores 60 than lower ratios of overlap. As described above, a match score based on proximity may be summed with a match score based on feature matching to compute the match score 60. It should be appreciated that other tests and comparisons may be calculated for the candidate blob 32 and aggregated into the match score 60.

After computing the match score 60 between the candidate blob 32 and identified blobs 54 from the list 52, the blob detection module 30 is configured to identify the candidate blob 32 as being a new blob or one of the identified blobs 54 in the list 52 based on the match score 60. For example, the blob detection module 30 may be configured to identify the candidate blob 32 as an identified blob 54 in the list 52 having a highest match score 60 that is above a threshold match score value. If the match score 60 for every identified blob 54 in the list 52 is below the threshold match score value, then the blob detection module 30 may be configured to identify the candidate blob 32 as a new blob.

In one example, if the candidate blob 32 is identified as being a new blob, the processor 20 may be configured to update the list 52 of identified blobs 54 with the candidate blob 32 including the determined blob features 46 and position 48 of the candidate blob 32. The processor 20 may also be configured to assign the new blob with a unique blob identifier 58. In this example, identified blobs 54 including the new blob are not stored with pixels from the series of images 28 captured by the camera device 22. Rather, only the extracted blob features 46, the path of tracked positions 56, and other non-personally identifying data for an identified blob 54 are stored in the list 52. In this manner, computer system 10 does not store any personally identifying information, and only tracks anonymized blob data.

In one example, if the candidate blob 32 is identified as one of the identified blobs 54 in the list 52, the processor 20 may be configured to update the path of tracked positions 56 for the one of the identified blobs with the determined position 48 of the candidate blob 32. That is, once the candidate blob 32 has been identified as a particular blob in the list 52, the path of tracked positions for that particular blob may be updated to include the most recent determined position 48.

In the manner described above, the computer device 12 may accurately identify candidate blobs 32 from a list 52 of identified blobs 54 with a disjointed path of travel. For example, if a person moves out of a camera frame of a camera device 22 for a period of time before reentering the camera frame at a different location, the computer device 12 may nonetheless accurately identify a candidate blob of the person based on performing feature matching according to the processes described above. Further, the list 52 of identified blobs 54 may be shared with other computer devices in the computer system 10, such as a plurality of processor integrated camera devices in a peer-to-peer manner, such that blobs identified by a first processor integrated camera device may be appropriately identified by a second processor integrated camera device based on the blob features and path of tracked positions 56 for the identified blob.

Figure 6:
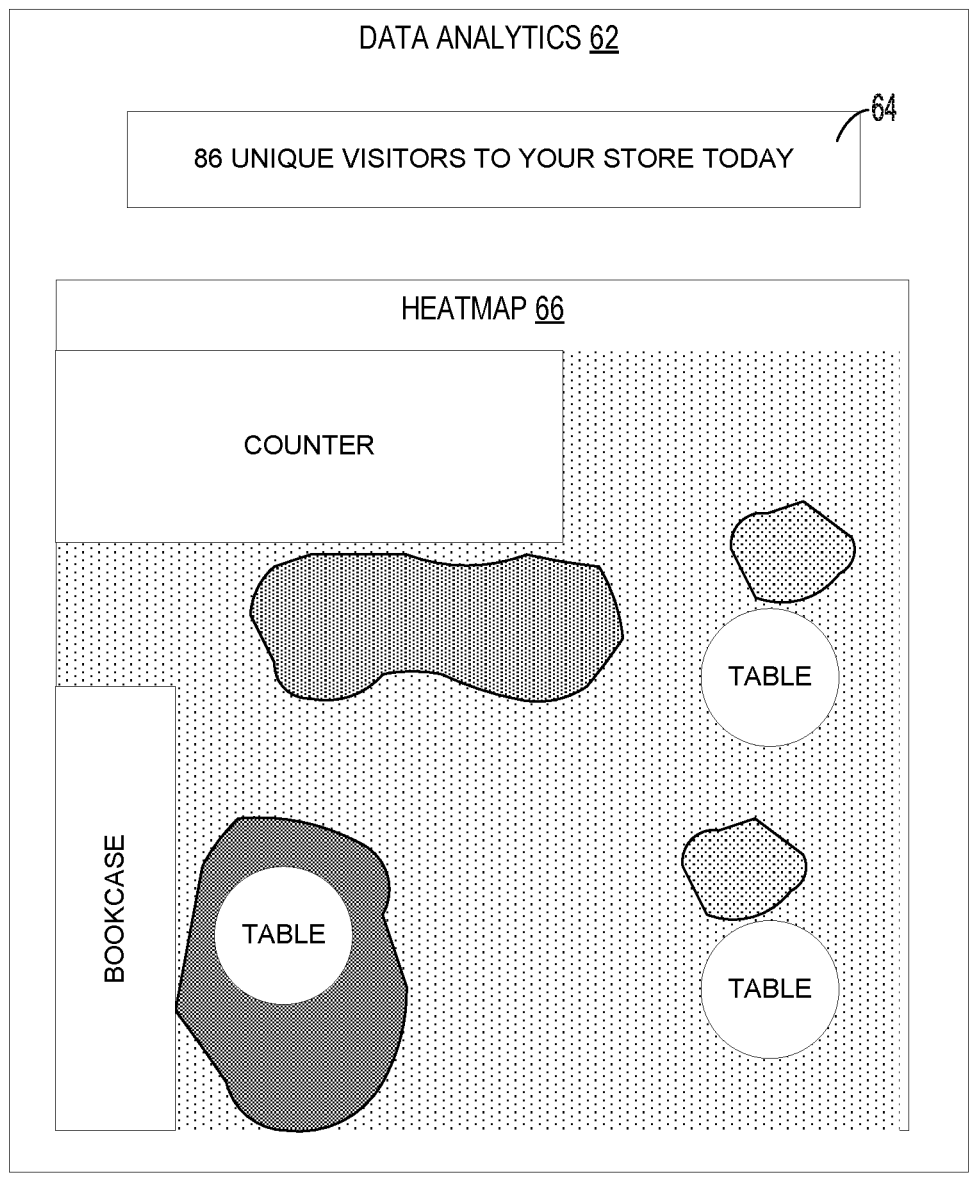
FIG. 6 shows an example heatmap generated by the computer system of FIG. 1.

In one example, the processor 20 of the computer device 12 may be further configured to perform statistical analysis on the identified blobs 54 and the associated path of tracked positions 56 for those identified blobs 54. FIG. 6 illustrates an example of data analytics 62 that may be generated by the processor 20. In one example, the data analytics 62 include a count 64 for the number of unique blobs identified during a specified period of time. In another example, the processor 20 may be configured to generate a heatmap 66 indicating the path of tracked positions 56 for each identified blob in the list 52. That is, the heatmap 66 may graphically indicate how often/long customers moved to particular areas of the physical space 26 based on the path of tracked positions 56 for each unique identified blob 54. It should be appreciated that the processor 20 may be configured to compute other types of data analytic based on the data gathered for the blobs. The generated data analytics 62 may be presented to a user via any mediums, such as, for example, a display, a speaker, etc. In one example, the data analytics 62 may be generated by the server system 14 and accessed by a user via a client computer device.

Figure 7:
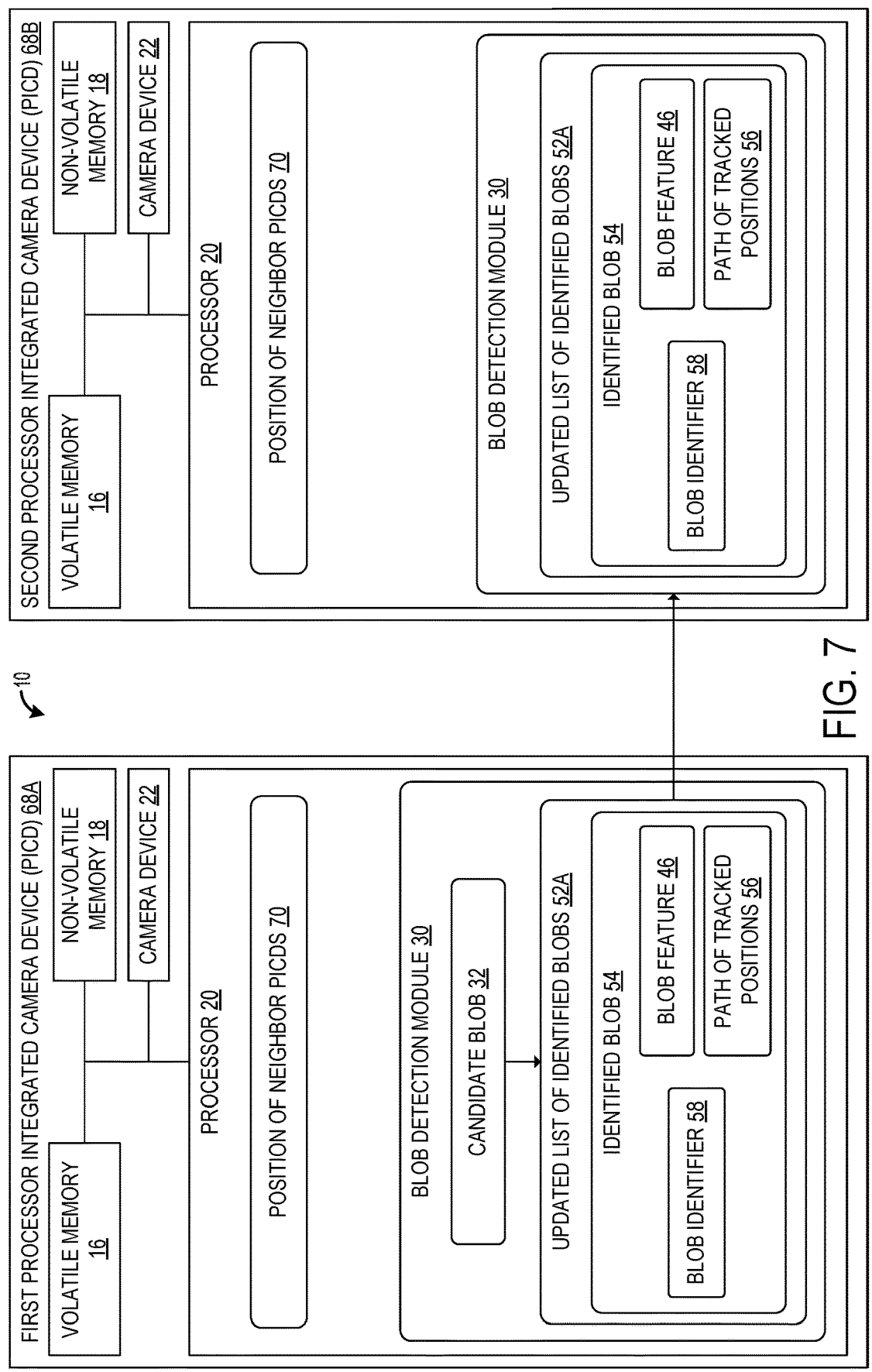
FIG. 7 shows two processor integrated camera devices of the computer system of FIG. 1.

FIG. 7 illustrates an example computer system 10 that include a plurality of computer device 12 taking the form of processor integrated camera devices 68. Each of the plurality of processor integrated camera device 68 may perform the processes and algorithms described above. Additionally, each processor integrated camera device 68 may store a position 70 of each other neighbor processor integrated camera devices 68 in the computer system 10. In the illustrated example, a first processor integrated camera device 68A stores a position of each other neighbor processor integrated camera device 68, which, for example, may include a second processor integrated camera device 68B. After identifying a candidate blob 32 and updating the list of identified blobs, the first processor integrated camera device 68A may be configured to share the updated list of identified blobs 52A with other processor integrated camera devices 68 of the computer system 10. For example, the first processor integrated camera device 68A may be configured to share the updated list of identified blobs 52A over a network in a peer-to-peer manner with other processor integrated camera devices 68. In one example, after updating the list of identified blobs, the first processor integrated camera device 68A may be configured to share the updated list of identified blobs 52A with each other processor integrated camera devices 68 in the computer system 10.

In another example, the first processor integrated camera device 68A may be configured to share the updated list of identified blobs 52A with other processor integrated camera devices 68 that are likely to see one of the blobs identified by the first processor integrated camera device 68A. For example, the first processor integrated camera device 68A may be configured to determine that the candidate blob 32 is heading toward another processor integrated camera device 68 based on the path of tracked positions 56 for the candidate blob 32. That is, after identifying the candidate blob 32 and tracking its path, the first processor integrated camera device 68A may compare the path of tracked positions 56 for the identified candidate blob to the stored positions of neighboring processor integrated camera devices 68 and select a processor integrated camera device 68 that is likely to overlap with the path of the candidate blob. The first processor integrated camera device 68A may be further configured to send the determined blob feature 46 and the path of tracked positions 56 for the candidate blob 32 to the another processor integrated camera device 68 that has a position that was determined to overlap with the path of the candidate blob 32.

Figure 8:
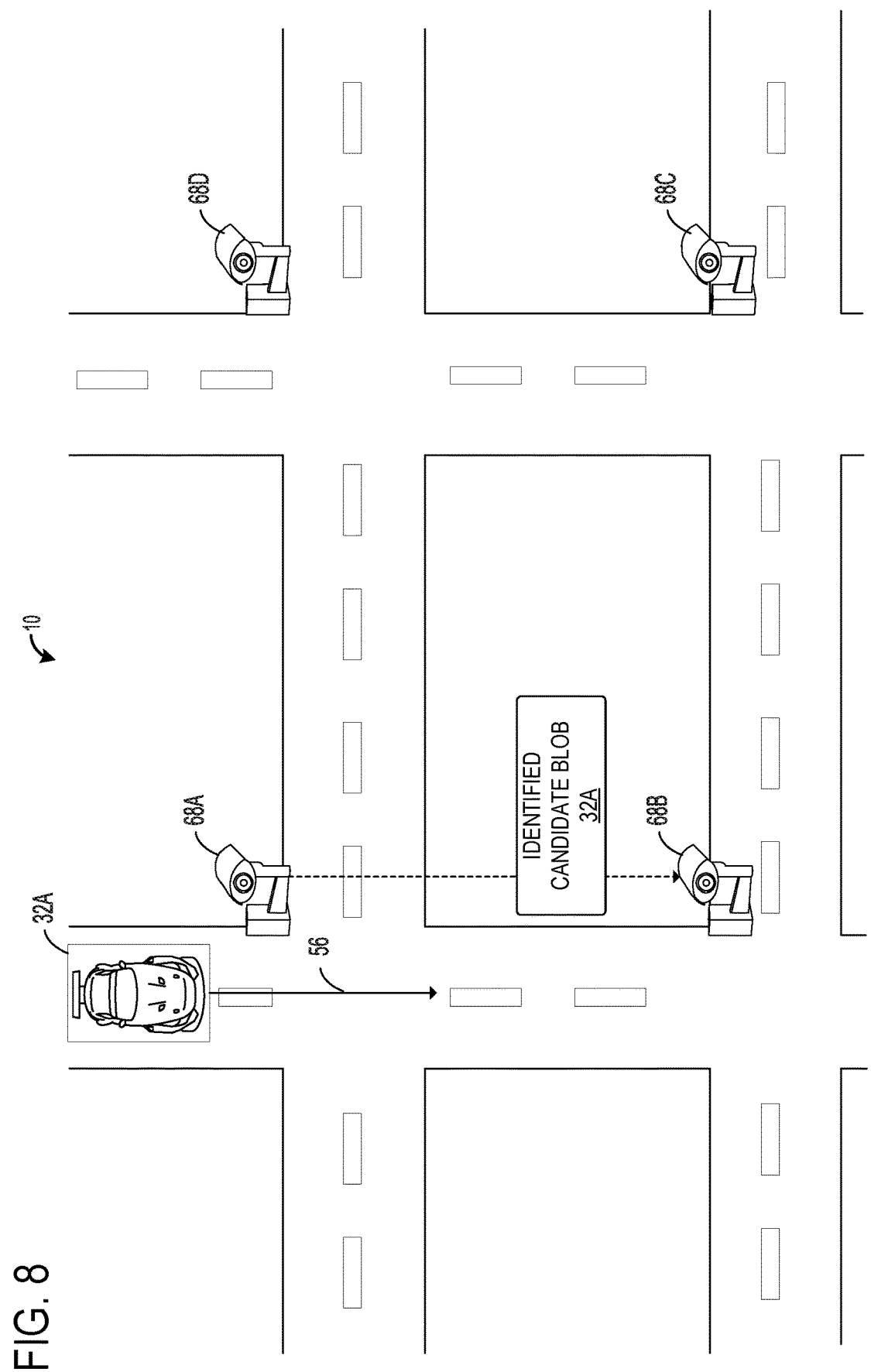
FIG. 8 shows a plurality of processor integrated camera device of the computer system of FIG. 1.

FIG. 8 illustrates an example computer system 10 that includes a first processor integrated camera device 68A, a second processor integrated camera device 68B, a third processor integrated camera device 68C, and a fourth processor integrated camera device 68D. As described with reference to FIG. 7, each of the processor integrated camera devices 68 may store the positions 70 of neighboring processor integrated devices. In the illustrated example, the first processor integrated camera device 68A captures a series of images of a nearby intersection. According to the processes and techniques described above with reference to FIG. 1, the first processor integrated camera device 68A detects a candidate blob 32A and identifies the candidate blob 32A as a new blob. Further, based on a path of tracked positions 56 determined for the identified candidate blob 32 and the positions 70 of neighboring the processor integrated camera devices, the first processor integrated camera device 68A determines that the identified candidate blob 32A is heading toward the second processor integrated camera device 68B. Based on that determination, the first processor integrated camera device 68A sends the determined blog feature 46 and the path of tracked positions 56 for the identified candidate blob 32A to the second processor integrated camera device 68B, but not the third or fourth processor integrated camera device 68C and 68D. In this manner, candidate blobs 32 may be identified and tracked across a plurality of processor integrated camera device 68 of the computer system 10 in an efficient peer-to-peer manner.

Figure 9:
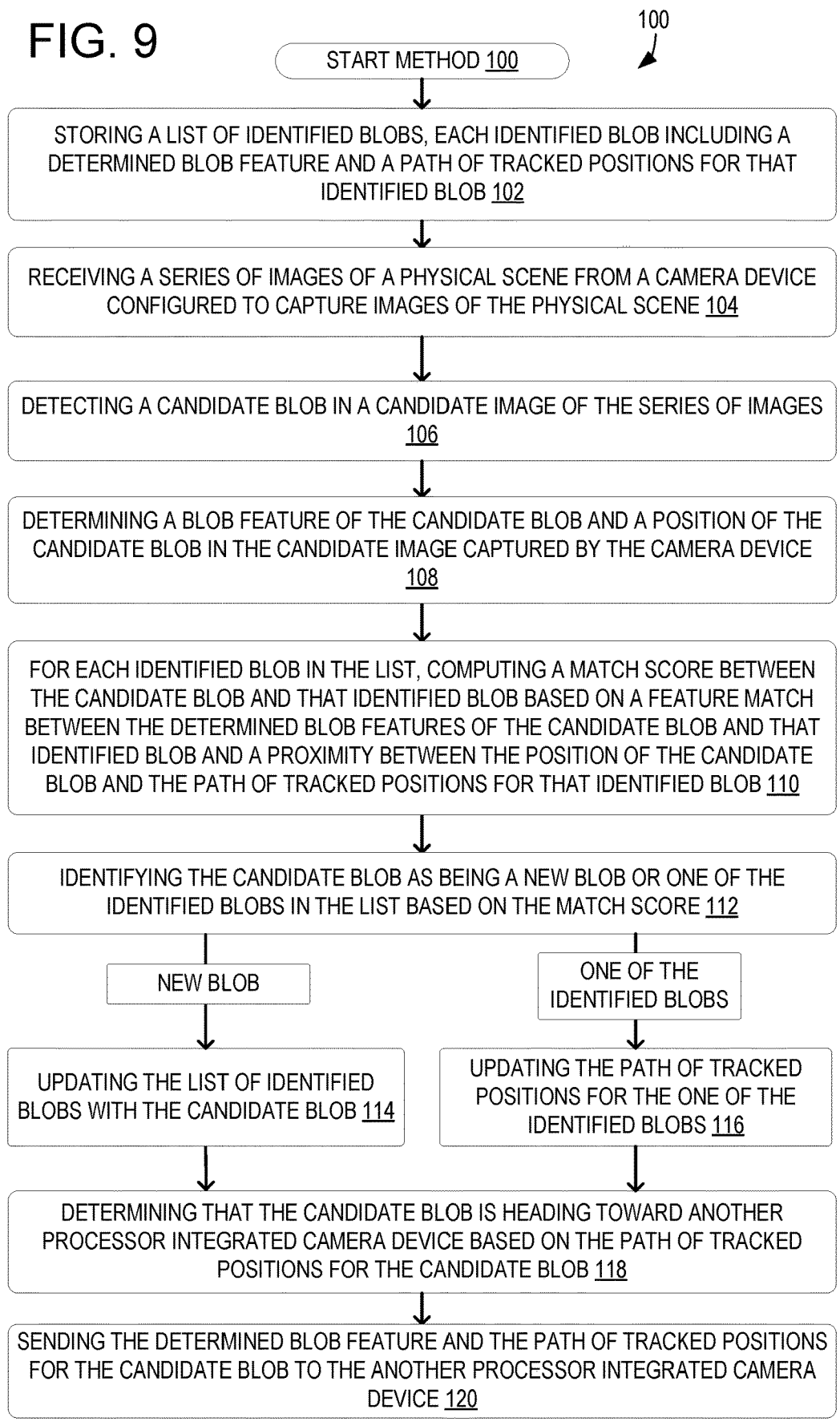
FIG. 9 shows a flowchart for a computer-implemented method for detecting and identifying blobs in a candidate image implemented by the computer system of FIG. 1.

FIG. 9 shows a flowchart of a computer-implemented method 100. The method 100 may be implemented by the computer system 10 of FIG. 1. At 102, the method 100 may include storing a list of identified blobs, each identified blob including a determined blob feature and a path of tracked positions for that identified blob. The list of identified blobs, as shown in the example illustrated in FIG. 1, may be maintained and updated by the processor of the computer device. In one example, the list of identified blobs may further be shared with other computer devices, such that each computer device receives updates to the list of identified blobs from other computer devices. In another example, a master list of identified blobs may be maintained by the server system, which may be configured to update each computer device. The list of identified blobs does not store pixels from the series of images captured by the camera device or other personally identifying information.

At 104, the method 100 may include receiving a series of images of a physical scene from a camera device configured to capture images of the physical scene. The series of images may be captured by the camera device as a video, with each frame of the video being a potential candidate image. In another example, the camera device may be configured to periodically capture the images, such as, for example, every second, every five seconds, etc. FIG. 2 illustrates an example physical space having two camera devices capturing images of the physical space.

At 106, the method 100 may include detecting a candidate blob in a candidate image of the series of images. FIGS. 3A and 3B depict one example technique for detecting candidate blobs in the example candidate image illustrated in FIG. 3A. In the example technique, for each pixel in the candidate image of the series of images, the method may include identifying whether that pixel is a background or a foreground pixel based on a history of that pixel over the series of images. That is, the background of the physical scene depicted in the candidate image of FIG. 3A may include walls, floors, tables, and other objects that typically do not frequently move over time or have a relatively static position over the series of images. The method may include determining pixel color values for each pixel position in the series of images captured by a camera device over a period of time and determining a baseline pixel color value for each pixel position in the series of images. After establishing a baseline pixel color value for each pixel position, the method may include comparing a pixel color value of each pixel in the candidate image to the corresponding baseline pixel color value for that pixel position in the frame of the images captured by that camera device to determine a color difference. Pixels of the candidate image having a color difference below a threshold value may be tagged as a background pixel, and pixels of the candidate image having a color difference above the threshold value may be tagged as a foreground pixel. Next, the method may include detecting the candidate blob based on identifying a contiguous group of foreground pixels in the candidate image. In one example, contiguous groups of foreground pixels below a threshold size are not detected as candidate blobs. This example blob detection technique is described in more detail above with reference to FIGS. 3A and 3B.

At 108, the method 100 may include determining a blob feature of the candidate blob and a position of the candidate blob in the candidate image captured by the camera device. The determined blob features may include an edge detection feature, a color histogram feature, a geometric feature, or another type of blob feature. For example, the method may include detecting one or more edges of the contiguous of foreground pixels in the candidate blob and distances between those edges for the edge detection feature. As another example, the method may include extracting a color histogram for the contiguous group of foreground pixels. The color histogram may include data indicating a distribution of colors for the candidate blob, an entropy value for the colors of the candidate blob, etc. As another example, the method may include determining one or more geometric features of the candidate blob, such as, for example, a blob area, a size of the boundary box, a blob shape, a blob height and width, geometric moments of the blob, etc.

Figure 5:
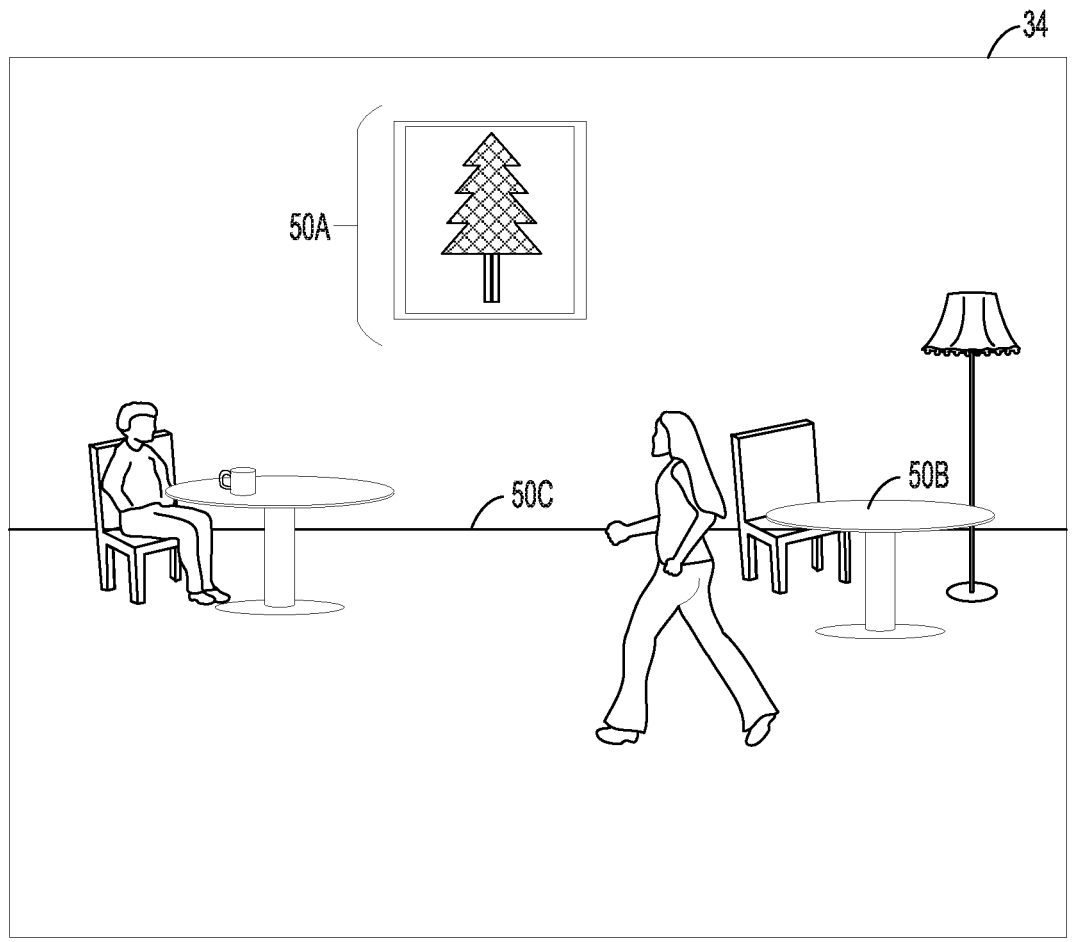
FIG. 5 shows example background features detected in the candidate image captured by the camera devices of the computer system of FIG. 1.

In one example, the position of the blob may be determined relative to a pixel position of the candidate blob in the frame of the image captured by the camera device. For example, the candidate blob may be given an X and Y pixel coordinate, which may be calculated at a center or centroid of the candidate blob. As another example, the position of the blob may be determined relative to machine recognizable background features. In this example, the method may include detecting one or more background features of the background pixels, and determining the position of the candidate blob relative to the one or more detected background features. FIG. 5 illustrates a few examples of machine recognizable background features that may be used as a reference for calculating the position of a candidate blob.

At 110, the method 100 may include, for each identified blob in the list, computing a match score between the candidate blob and that identified blob based on a feature match between the determined blob features of the candidate blob and that identified blob and a proximity between the position of the candidate blob and the path of tracked positions for that identified blob. The method may utilize any suitable feature matching algorithm to compute the feature match between the candidate blob and the identified blob. Example techniques are described above, such as using an Orientated FAST and Rotate BRIEF (ORB) algorithm, using a neural network to generate a thumbprint of the determined blob features, or using a scale-invariant feature transform (SIFT) algorithm to generate a feature description of the candidate blob and the identified blob that may be used to compute the feature score. It should be appreciated that the feature matching techniques described above are merely exemplary.

To determine a proximity score, the method may include calculating a distance, such as a pixel distance or physical distance, between the position of the candidate blob and a last known position of the path of tracked positions for the identified blob being compared. A smaller distance may be given a higher proximity score than a larger distance. That is, the closer in proximity the candidate blob is to the last known position of the identified blob being compared, the higher the proximity score given to that identified blob.

In another example, the proximity score may be further calculated based on an overlap between a bounding box of the candidate blob and the path of tracked positions 56 for the identified blob 54. In one example, larger ratios of overlap between the bounding box of the candidate blob and the path of tracked positions for that identified blob are given higher match scores than lower ratios of overlap. As described above, a match score based on proximity may be summed with a match score based on feature matching to compute the match score. It should be appreciated that other tests and comparisons may be calculated for the candidate blob and aggregated into the match score.

At 112, the method 100 may include identifying the candidate blob as being a new blob or one of the identified blobs in the list based on the match score. For example, a candidate blob may be identified as an identified blob in the list having a highest match score that is above a threshold match score value. If the match score for every identified blob in the list is below the threshold match score value, then the candidate blob may be identified as a new blob.

If the candidate blob is identified as being a new blob, then the method 100 may advance from step 112 to step 114 and may include updating the list of identified blobs with the candidate blob. For example, the candidate blob may be assigned a new unique blob identifier and stored in the list of identified blobs with the unique blob identifier, one or more determined blob features, and the path of tracked positions for the candidate blob.

On the other hand, if the candidate blob is identified as one of the identified blobs in the list, then the method 100 may advance from step 112 to step 116 and may include updating the path of tracked positions for the one of the identified blobs with the determined position of the candidate blob. That is, once the candidate blob has been identified as one of the identified blobs, the blob data for that identified blob in the list may be updated to add the most recently tracked position to the path of tracked positions of that identified blob.

In one example, as illustrated in FIGS. 7 and 8, the processor is integrated with the camera device. Additionally, the computer system may include a plurality of processor integrated camera devices configured for sharing the updated list of identified blobs with other processor integrated camera devices. In this example, the method 100 may include steps 118 and 120. At 118, the method 100 may include determining that the candidate blob is heading toward another processor integrated camera device based on the path of tracked positions for the candidate blob. As illustrated in FIG. 7, each of the processor integrated camera devices may store the positions 70 of neighboring processor integrated camera devices in the computer system. Based on a determined heading of the candidate blob, a processor integrated camera device may determine whether another processor integrated camera device is likely to view the candidate blob based on its known position.

At 120, the method 100 may include sending the determined blob feature and the path of tracked positions for the candidate blob to the another processor integrated camera device. That is, if a processor integrated camera device determines that a particular other processor integrated camera device is likely to see the candidate blob based on the heading of the candidate blob and the position of that particular other processor integrated camera device, then blob data for that candidate blob may be sent to that particular other processor integrated camera device in a peer-to-peer manner over a network. The particular other processor integrated camera device may then compare each blob that it sees to the received blob data to identify whether it is the candidate blob. In this manner, a particular candidate blob may be efficiently tracked across the plurality of processor integrated camera devices of the computer system in a distributed peer-to-peer manner.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
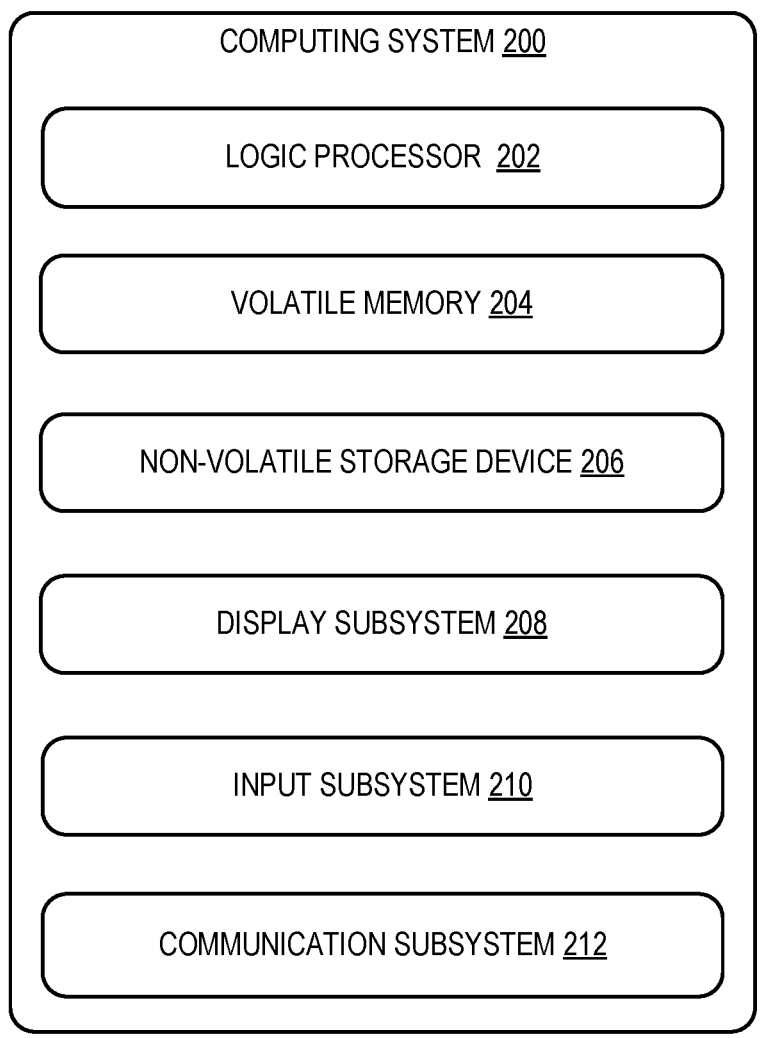
FIG. 10 shows a schematic view of an example computing environment in which the computer system of FIG. 1 may be enacted.

FIG. 10 schematically shows a non-limiting embodiment of a computing system 200 that can enact one or more of the methods and processes described above. Computing system 200 is shown in simplified form. Computing system 200 may, for example, embody the computer device 12 of FIG. 1, the server system 14, or may instead embody some other computing system. Computing system 200 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented/virtual reality devices.

Computing system 200 includes a logic processor 202, volatile memory 204, and a non-volatile storage device 206. Computing system 200 may optionally include a display subsystem 208, input subsystem 210, communication subsystem 212, and/or other components not shown in FIG. 10.

Logic processor 202 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 202 may include one or more physical processors (hardware) configured to execute software instructions. Additionally or alternatively, the logic processor 202 may include one or more hardware logic circuits or firmware devices configured to execute hardware-implemented logic or firmware instructions. Processors of the logic processor 202 may be single-core or multi-core, and the instructions executed thereon may be configured for sequential, parallel, and/or distributed processing. Individual components of the logic processor 202 optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects may be run on different physical logic processors of various different machines.

Volatile memory 204 may include physical devices that include random access memory. Volatile memory 204 is typically utilized by logic processor 202 to temporarily store information during processing of software instructions. It will be appreciated that volatile memory 204 typically does not continue to store instructions when power is cut to the volatile memory 204.

Non-volatile storage device 206 includes one or more physical devices configured to hold instructions executable by the logic processors to implement the methods and processes described herein. When such methods and processes are implemented, the state of non-volatile storage device 206 may be transformed—e.g., to hold different data.

Non-volatile storage device 206 may include physical devices that are removable and/or built-in. Non-volatile storage device 206 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 206 may include nonvolatile, dynamic, static, read/write, read-only, sequential-access, location-addressable, file-addressable, and/or content-addressable devices. It will be appreciated that non-volatile storage device 206 is configured to hold instructions even when power is cut to the non-volatile storage device 206.

Aspects of logic processor 202, volatile memory 204, and non-volatile storage device 206 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system 200 implemented to perform a particular function. In some cases, a program may be instantiated via logic processor 202 executing instructions held by non-volatile storage device 206, using portions of volatile memory 204. It will be understood that different programs may be instantiated from the same application, service, code block, object, library, routine, API, function, etc. Likewise, the same program may be instantiated by different applications, services, code blocks, objects, routines, APIs, functions, etc. The term "program" encompasses individual or groups of executable files, data files, libraries, drivers, scripts, database records, etc.

When included, display subsystem 208 may be used to present a visual representation of data held by non-volatile storage device 206. As the herein described methods and processes change the data held by the non-volatile storage device 206, and thus transform the state of the non-volatile storage device 206, the state of display subsystem 208 may likewise be transformed to visually represent changes in the underlying data. Display subsystem 208 may include one or more display devices utilizing virtually any type of technology. Such display devices may be combined with logic processor 202, volatile memory 204, and/or non-volatile storage device 206 in a shared enclosure, or such display devices may be peripheral display devices.

When included, input subsystem 210 may comprise or interface with one or more user-input devices such as a keyboard, mouse, touch screen, or game controller. In some embodiments, the input subsystem 210 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection, gaze detection, and/or intent recognition; as well as electric-field sensing componentry for assessing brain activity; and/or any other suitable sensor.

When included, communication subsystem 212 may be configured to communicatively couple computing system 200 with one or more other computing devices. Communication subsystem 212 may include wired and/or wireless communication devices compatible with one or more different communication protocols. As non-limiting examples, the communication subsystem 212 may be configured for communication via a wireless telephone network, or a wired or wireless local- or wide-area network. In some embodiments, the communication subsystem 212 may allow computing system 200 to send and/or receive messages to and/or from other devices via a network such as the Internet.

The following paragraphs provide additional support for the claims of the subject application. One aspect provides a computer system comprising a camera device configured to capture images of a physical scene. The computer system further comprises a processor configured to store a list of identified blobs, each identified blob including a determined blob feature and a path of tracked positions for that identified blob. The processor is further configured to receive a series of images of the physical scene from the camera device, detect a candidate blob in a candidate image of the series of images, and determine a blob feature of the candidate blob and a position of the candidate blob in the candidate image captured by the camera device. For each identified blob in the list, the processor is further configured to compute a match score between the candidate blob and that identified blob based on a feature match between the determined blob features of the candidate blob and that identified blob and a proximity between the position of the candidate blob and the path of tracked positions for that identified blob. The processor is further configured to identify the candidate blob as being a new blob or one of the identified blobs in the list based on the match score. If the candidate blob is identified as being a new blob, the processor is configured to update the list of identified blobs with the candidate blob. If the candidate blob is identified as one of the identified blobs in the list, the processor is configured to update the path of tracked positions for the one of the identified blobs with the determined position of the candidate blob. In this aspect, additionally or alternatively, to detect the candidate blob the processor may be further configured to, for each pixel in the candidate image of the series of images, identify whether that pixel is a background or a foreground pixel based on a history of that pixel over the series of images, and detect the candidate blob based on identifying a contiguous group of foreground pixels in the candidate image. In this aspect, additionally or alternatively, contiguous groups of foreground pixels below a threshold size may not be detected as candidate blobs. In this aspect, additionally or alternatively, the processor may be further configured to detect one or more background features of the background pixels, and determine the position of the candidate blob relative to the one or more detected background features. In this aspect, additionally or alternatively, the determined blob features may be selected from the group consisting of an edge detection feature, a color histogram feature, and a geometric feature. In this aspect, additionally or alternatively, the processor may be further configured to determine a bounding box for the candidate blob, and wherein larger ratios of overlap between the bounding box of the candidate blob and the path of tracked positions for that identified blob may be given higher match scores than lower ratios of overlap. In this aspect, additionally or alternatively, the processor may be integrated with the camera device, and wherein the computer system may include a plurality of processor integrated camera devices configured to share the updated list of identified blobs with other processor integrated camera devices. In this aspect, additionally or alternatively, each processor integrated camera device may be configured to determine that the candidate blob is heading toward another processor integrated camera device based on the path of tracked positions for the candidate blob, and send the determined blob feature and the path of tracked positions for the candidate blob to the another processor integrated camera device. In this aspect, additionally or alternatively, the list of identified blobs may not store pixels from the series of images captured by the camera device. In this aspect, additionally or alternatively, the processor may be further configured to generate a heatmap indicating the path of tracked positions for each identified blob in the list.

Another aspect provides a method comprising, at a computer system including a processor, storing a list of identified blobs, each identified blob including a determined blob feature and a path of tracked positions for that identified blob. The method further comprises receiving a series of images of a physical scene from a camera device configured to capture images of the physical scene, detecting a candidate blob in a candidate image of the series of images, and determining a blob feature of the candidate blob and a position of the candidate blob in the candidate image captured by the camera device. The method further comprises, for each identified blob in the list, computing a match score between the candidate blob and that identified blob based on a feature match between the determined blob features of the candidate blob and that identified blob and a proximity between the position of the candidate blob and the path of tracked positions for that identified blob. The method further comprises identifying the candidate blob as being a new blob or one of the identified blobs in the list based on the match score. The method further comprises, if the candidate blob is identified as being a new blob, updating the list of identified blobs with the candidate blob, and if the candidate blob is identified as one of the identified blobs in the list, updating the path of tracked positions for the one of the identified blobs with the determined position of the candidate blob. In this aspect, additionally or alternatively, detecting the candidate blob may further comprise, for each pixel in the candidate image of the series of images, identifying whether that pixel is a background or a foreground pixel based on a history of that pixel over the series of images, and detecting the candidate blob based on identifying a contiguous group of foreground pixels in the candidate image. In this aspect, additionally or alternatively, contiguous groups of foreground pixels below a threshold size may not be detected as candidate blobs. In this aspect, additionally or alternatively, the method may further comprise detecting one or more background features of the background pixels, and determining the position of the candidate blob relative to the one or more detected background features. In this aspect, additionally or alternatively, the determined blob features may be selected from the group consisting of an edge detection feature, a color histogram feature, and a geometric feature. In this aspect, additionally or alternatively, the method may further comprise determining a bounding box for the candidate blob, and wherein larger ratios of overlap between the bounding box of the candidate blob and the path of tracked positions for that identified blob may be given higher match scores than lower ratios of overlap. In this aspect, additionally or alternatively, the processor may be integrated with the camera device, and wherein the computer system may include a plurality of processor integrated camera devices configured for sharing the updated list of identified blobs with other processor integrated camera devices. In this aspect, additionally or alternatively, the method may further comprise determining that the candidate blob is heading toward another processor integrated camera device based on the path of tracked positions for the candidate blob, and sending the determined blob feature and the path of tracked positions for the candidate blob to the another processor integrated camera device. In this aspect, additionally or alternatively, the list of identified blobs may not store pixels from the series of images captured by the camera device.

Another aspect provides a computer system comprising a plurality of processor integrated camera devices. Each respective processor of each of the plurality of processor integrated camera devices is configured to store a list of identified blobs, each identified blob including a determined blob feature and a path of tracked positions for that identified blob. Each respective processor of each of the plurality of processor integrated camera devices is further configured to receive a series of images of the physical scene from the camera device, detect a candidate blob in a candidate image of the series of images, and determine a blob feature of the candidate blob and a position of the candidate blob in the candidate image captured by the camera device. Each respective processor of each of the plurality of processor integrated camera devices is further configured to, for each identified blob in the list, compute a match score between the candidate blob and that identified blob based on a feature match between the determined blob features of the candidate blob and that identified blob and a proximity between the position of the candidate blob and the path of tracked positions for that identified blob. Each respective processor of each of the plurality of processor integrated camera devices is further configured to identify the candidate blob based on the match score, determine that the candidate blob is heading toward another processor integrated camera device based on the path of tracked positions for the candidate blob, and send the determined blob feature and the path of tracked positions for the candidate blob to the another processor integrated camera device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer system comprising:
a camera device configured to capture images of a physical scene; and
a processor configured to:
store a list of identified blobs, each identified blob including a determined blob feature and a path of tracked positions for that identified blob;
receive a series of images of the physical scene from the camera device;
detect a candidate blob in a candidate image of the series of images;
determine a blob feature of the candidate blob and a position of the candidate blob in the candidate image captured by the camera device;
for each identified blob in the list, compute a match score between the candidate blob and that identified blob based on a feature match between the determined blob features of the candidate blob and that identified blob and a proximity between the position of the candidate blob and the path of tracked positions for that identified blob;
identify the candidate blob as being a new blob or one of the identified blobs in the list based on the match score;
if the candidate blob is identified as being a new blob, update the list of identified blobs with the candidate blob; and
if the candidate blob is identified as one of the identified blobs in the list, update the path of tracked positions for the one of the identified blobs with the determined position of the candidate blob.

2. The computer system of claim 1, wherein to detect the candidate blob the processor is further configured to:
for each pixel in the candidate image of the series of images, identify whether that pixel is a background or a foreground pixel based on a history of that pixel over the series of images; and
detect the candidate blob based on identifying a contiguous group of foreground pixels in the candidate image.

3. The computer system of claim 2, wherein contiguous groups of foreground pixels below a threshold size are not detected as candidate blobs.

4. The computer system of claim 2, wherein the processor is further configured to:
detect one or more background features of the background pixels; and
determine the position of the candidate blob relative to the one or more detected background features.

5. The computer system of claim 1, wherein the determined blob features are selected from the group consisting of an edge detection feature, a color histogram feature, and a geometric feature.

6. The computer system of claim 1, wherein the processor is further configured to determine a bounding box for the candidate blob, and wherein larger ratios of overlap between the bounding box of the candidate blob and the path of tracked positions for that identified blob are given higher match scores than lower ratios of overlap.

7. The computer system of claim 1, wherein the processor is integrated with the camera device, and wherein the computer system includes a plurality of processor integrated camera devices configured to share the updated list of identified blobs with other processor integrated camera devices.

8. The computer system of claim 7, wherein each processor integrated camera device is configured to:
determine that the candidate blob is heading toward another processor integrated camera device based on the path of tracked positions for the candidate blob; and
send the determined blob feature and the path of tracked positions for the candidate blob to the another processor integrated camera device.

9. The computer system of claim 1, wherein the list of identified blobs does not store pixels from the series of images captured by the camera device.

10. The computer system of claim 1, wherein the processor is further configured to generate a heatmap indicating the path of tracked positions for each identified blob in the list.

11. A method comprising:
at a computer system including a processor:
storing a list of identified blobs, each identified blob including a determined blob feature and a path of tracked positions for that identified blob;
receiving a series of images of a physical scene from a camera device configured to capture images of the physical scene;
detecting a candidate blob in a candidate image of the series of images;
determining a blob feature of the candidate blob and a position of the candidate blob in the candidate image captured by the camera device;
for each identified blob in the list, computing a match score between the candidate blob and that identified blob based on a feature match between the determined blob features of the candidate blob and that identified blob and a proximity between the position of the candidate blob and the path of tracked positions for that identified blob;

identifying the candidate blob as being a new blob or one of the identified blobs in the list based on the match score;

if the candidate blob is identified as being a new blob, updating the list of identified blobs with the candidate blob; and if the candidate blob is identified as one of the identified blobs in the list, updating the path of tracked positions for the one of the identified blobs with the determined position of the candidate blob.

12. The method of claim 11, wherein detecting the candidate blob further comprises:

for each pixel in the candidate image of the series of images, identifying whether that pixel is a background or a foreground pixel based on a history of that pixel over the series of images; and detecting the candidate blob based on identifying a contiguous group of foreground pixels in the candidate image.

13. The method of claim 12, wherein contiguous groups of foreground pixels below a threshold size are not detected as candidate blobs.

14. The method of claim 12, further comprising:

detecting one or more background features of the background pixels; and determining the position of the candidate blob relative to the one or more detected background features.

15. The method of claim 11, wherein the determined blob features are selected from the group consisting of an edge detection feature, a color histogram feature, and a geometric feature.

16. The method of claim 11, further comprising determining a bounding box for the candidate blob, and wherein larger ratios of overlap between the bounding box of the candidate blob and the path of tracked positions for that identified blob are given higher match scores than lower ratios of overlap.

17. The method of claim 11, wherein the processor is integrated with the camera device, and wherein the computer system includes a plurality of processor integrated camera devices configured for sharing the updated list of identified blobs with other processor integrated camera devices.

18. The method of claim 17, further comprising:

determining that the candidate blob is heading toward another processor integrated camera device based on the path of tracked positions for the candidate blob; and sending the determined blob feature and the path of tracked positions for the candidate blob to the another processor integrated camera device.

19. The method of claim 11, wherein the list of identified blobs does not store pixels from the series of images captured by the camera device.

20. A computer system comprising:

a plurality of processor integrated camera devices, wherein each respective processor of each of the plurality of processor integrated camera devices is configured to:

store a list of identified blobs, each identified blob including a determined blob feature and a path of tracked positions for that identified blob;

receive a series of images of the physical scene from the camera device;

detect a candidate blob in a candidate image of the series of images;

determine a blob feature of the candidate blob and a position of the candidate blob in the candidate image captured by the camera device;

for each identified blob in the list, compute a match score between the candidate blob and that identified blob based on a feature match between the determined blob features of the candidate blob and that identified blob and a proximity between the position of the candidate blob and the path of tracked positions for that identified blob;

identify the candidate blob based on the match score;

determine that the candidate blob is heading toward another processor integrated camera device based on the path of tracked positions for the candidate blob; and send the determined blob feature and the path of tracked positions for the candidate blob to the another processor integrated camera device.

* * * * *